DEMODULATOR FOR TIME MODULATED SIGNALS

Filed Jan. 6, 1964

INVENTOR.
WAYNE K. HODDER
BY
Christie, Parker & Hale
ATTORNEYS.

United States Patent Office 3,271,689

Patented Sept. 6, 1966

3,271,689
DEMODULATOR FOR TIME MODULATED SIGNALS

Wayne K. Hodder, Glendora, Calif., assignor to Bell & Howell Company, Chicago, Ill., a corporation of Illinois Filed Jan. 6, 1964, Ser. No. 335,727
4 Claims. (Cl. 329—136)

This invention relates to demodulation and, more particularly, is concerned with a circuit for demodulating time modulated signals with reduced distortion.

In time modulation systems, such as frequency modulation, phase modulation, period modulation, pulse duration modulation, pulse position modulation, and the like, the change in time relationship of a periodic signal is varied according to the changes in amplitude of an information signal. Demodulation is accomplished in various ways depending upon the particular form of time modulation involved. It is characteristic of any demodulation scheme that frequency components are present in the demodulated signal that are not present in the original information signal. Some of these frequency components are outside the frequency band of the information signal and can be removed by a suitable low-pass filter which passes only the frequencies in the information band.

However, other frequency components may fall within the information frequency band causing distortions. Such distorting frequency components are a problem particularly in broad band modulation systems where the frequency range of the information falls within the frequency range used in the transmission system. For example, in broad band F-M magnetic recording the carrier frequency may be only slightly above the highest frequency information signal. Under these circumstances, the lower side band components produced by demodulation have frequencies which fall within the range of the information signals.

The present invention provides an improved demodulator which generates signals that can be used to cancel out the unwanted frequency components. The information necessary to generate the cancellation signals is contained in the side band components which naturally occur in the demodulation process.

In brief, this is accomplished by providing a time demodulator which includes a suitable dectector. The output from the detector is fed as one input to a summing circuit. At the same time, the output of the detector is coupled through a band-pass filter to a non-linear network having, for example, a square-law transfer function. The output of the square-law network is coupled through a frequency compensation circuit to the other input of the summing circuit. Cancellation takes place in the summing circuit, the output of the summing circuit being applied to a low-pass filter from which the desired demodulation signal is derived.

For a more complete understanding of the invention, reference should be made to the accompanying drawing wherein.

Figure 1:
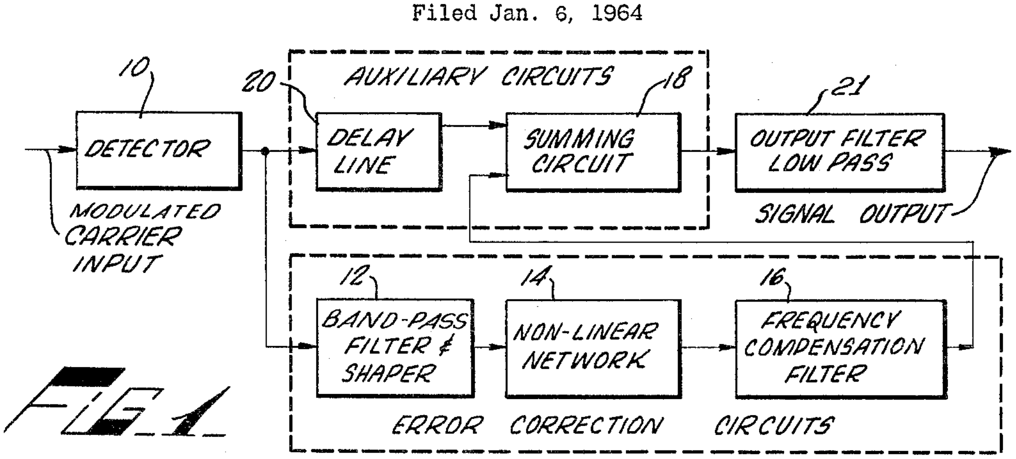
FIGURE 1 is a block diagram of the principal components comprising the demodulator circuit.

Referring to FIGURE 1, the numeral 10 indicates generally a suitable detector for demodulation of a time modulated carrier applied to the input. Detector 10 may take any well known form depending upon the particular type of modulation involved. For example, if the input signal is a frequency modulated carrier, the detector 10 may take the form of a zero-crossing demodulator circuit in which pulses of constant area are generated in response to each zero-crossover of the frequency modulated carrier signal.

Alternatively, where a modulation scheme is employed such as described in copending application Serial No. 231,916, filed October 22, 1962, in the name of the present inventor and assigned to the same assignee, the detector may be a demodulating arrangement as described in the copending application.

Figure 2:
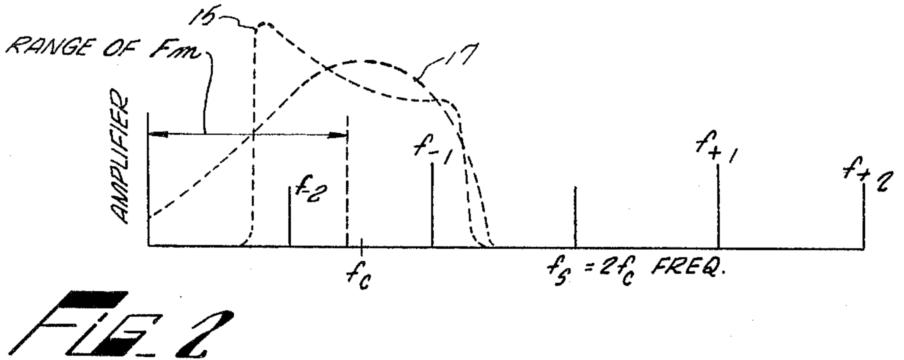
FIGURE 2 is a diagram showing the frequency spectrum on the output of the detector.

Whatever modulation and demodulation arrangement is used, if it involves time modulation, the output of the detector 10 will include a number of frequency components not present in the original modulating signal. FIGURE 2 shows a typical frequency spectrum of the output of the detector 10 where a zero-crossover detector is used in demodulating an F-M signal. In the frequency spectrum shown, $f_s$ is the sampling frequency, and in the present example would be twice the carrier frequency $f_c$ since each cycle of the carrier has two zero-crossover points at which the pulses are generated. $f_m$ is the frequency of the modulating signal and varies over a range below the carrier frequency. In broad band F-M modulation, the modulating signal may approach the carrier signal at the upper limit of the modulating frequency range. In addition to a component corresponding to the sampling frequency $f_s$ and the demodulating frequency $f_m$ in the output of the detector 10, there will be a number of side band frequencies $f_n$, where $n$ is a positive or negative integer as shown in FIGURE 2. The side band frequencies are equal to $f_s \pm nf_m$ where $n$ is an integer. It will be seen from the spectrum of FIGURE 2, that the side band $f_{-2}$ falls within the frequency range of the modulating signal. Thus a low-pass filter designed to pass the modulating frequency $f_m$ will also pass the side band frequency component $f_{-2}$ while cutting off the sampling frequency and upper side bands as well as the lower side band $f_{-1}$.

The present invention is directed to an arrangement for selectively cancelling the side band $f_{-2}$ or other lower side bands which fall within the frequency range of the modulating signal.

Referring again to FIGURE 1, the output from the detector 10 having a frequency spectrum corresponding to that shown in FIGURE 2 is applied to a band-pass filter and shaper 12 having a band-pass extending from roughly ¼ $f_s$ to ¾ $f_s$. This filter extracts the necessary information frequencies for generating the cancellation signals. This circuit may also be used to provide any particular shape of the transfer function, i.e., amplitude as a function of frequency. A typical transfer curve is shown by the broken line in FIGURE 2, indicated at 15. The output of the band-pass filter is applied to a non-linear network 14 which approximates a square-law function. The non-linear network generates a number of cross-product frequency components for each information frequency $f_m$, one of which can be used for cancelling the unwanted frequency component $f_{-2}$ in the output of the detector 10. The output from the non-linear network 14 is preferably passed through a frequency compensation filter 16 covering the same frequency range as the filter 12. The filter 16, however, does not cutoff sharply at the lower end but falls off gradually down to D.C. See the dotted line of FIGURE 2, indicated at 17. The output from the filter 16 is applied to one input of a combining or summing circuit 18 to which is also applied the output of the detector 10. A delay line 20 may be provided between the detector 10 and the combining circuit 18 to equalize the delay in the two channels going to the summing circuit.

The summing circuit 18 adds the two signals in the proper phase to provide cancellation of the unwanted side bands $f_{-2}$ in the output of the detector 10. The output from the summing circuit 18 is then applied to a low-pass filter 21 from which is derived a signal corresponding to the modulating signal.

Figure 3:
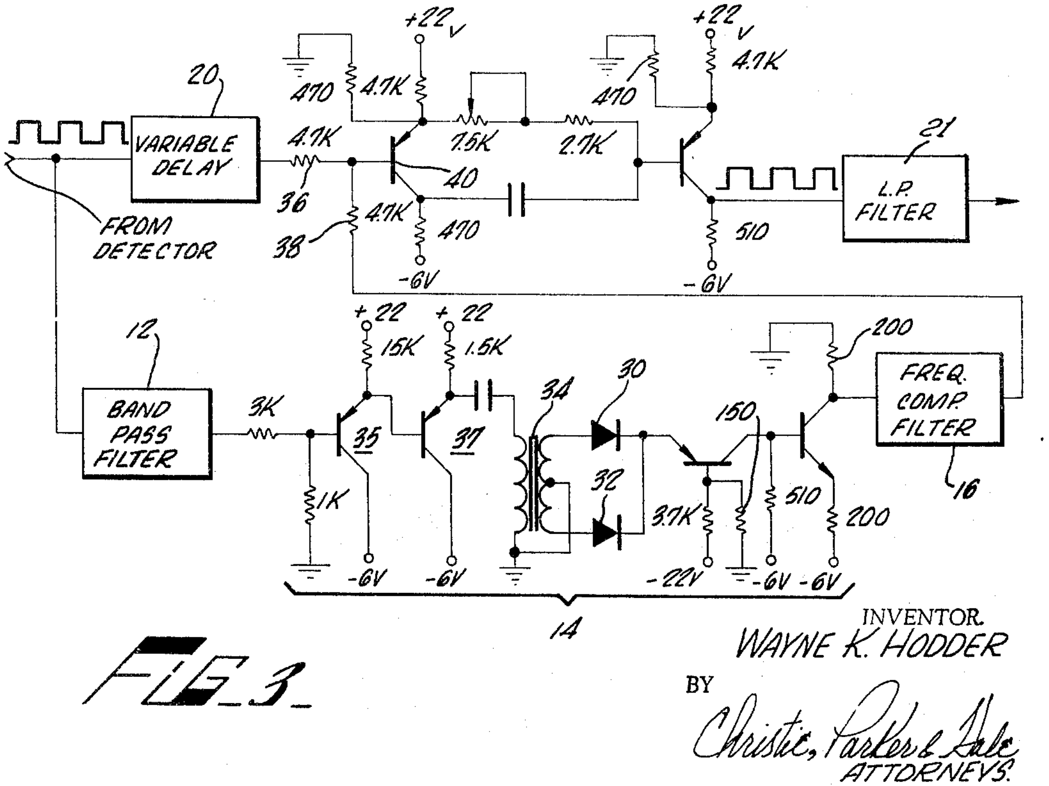
FIGURE 3 is a detailed schematic diagram of a complete circuit incorporating the features of the present invention.

FIGURE 3 shows the circuit in more detail designed for operation with a carrier frequency of 750K cycles per second or a sampling frequency of 1500K cycles per second. The filter 12 is designed to pass frequencies in the range from 400K to 1100K cycles per second.

The non-linear circuit 14 for providing the square-law function utilizes a pair of diodes 30 and 32 connected as a fullwave non-linear rectifier by means of a transformer 34 having a tapped secondary. The output of the filter 12 is coupled to the transformer primary through a pair of transistor amplifier stages 35 and 37. Square-law circuits of this type are well known.

The output from the square-law circuit is then passed through the frequency compensating filter 16 and applied to the combining circuit which includes a pair of summing resistors 36 and 38 connected to the base of a transistor amplifier stage 40. The modulating frequency component is then extracted by the low-pass filter 21.

In operation, it will be seen from FIGURE 2 that for mid-range and lower modulating frequencies, the principal side bands will be above the modulating frequency range and so will be eliminated by the output low-pass filter 21. The band-pass filter 12 ensures that, under these circumstances, the principal side bands $f_{-1}$ and $f_{-2}$ are not applied to the square-law network and so can not generate subharmonics which might fall within the modulating frequency range. While the modulating frequency is passed to the square-law network, it alone does not produce any unwanted frequency components at the output of the square-law network.

As the modulating frequency is increased to the upper range, the lower side band $f_{-1}$ as well as the modulating frequency, are passed by the band-pass filter 12 and applied to the square-law network 14. One of the cross-product terms generated when the modulating frequency component and the first lower side band component are passed through the square-law network is the same frequency as the second lower side band $f_{-2}$. It is this component, passed by the filter 16, that provides at least partial cancellation of the second lower side band component derived from the output of the detector in the combining circuit 18. It has been demonstrated that this arrangement can reduce the distortion frequencies from a range of 20% down below a range of 2%, thus providing a material improvement in the reproduced modulating frequency at the output of the low-pass filter.

While the invention has been described in terms of cancelling out the second lower side band, the third lower side band can also be cancelled if it introduces objectionable distortion. The non-linear network may be designed to have a cubic law function rather than a square-law function to generate the necessary frequencies to effect cancellation in such case.

What is claimed is:

1. A demodulator circuit for demodulating a carrier signal which is time modulated by an information signal, the demodulator including a detector for generating an output signal having frequency components corresponding to the information signal and unwanted side bands, a band-pass filter for passing signals on either side of the carrier frequency, the output of the detector being connected to the filter, a square-law network coupled to the output of the band-pass filter, a low-pass filter for passing only signals within the frequency range of the information signal, and means for combining the output of the square-law network with the output from the detector and applying the combined outputs to the low-pass filter.

2. A demodulation circuit for a carrier time-modulated by a wideband modulation signal, comprising a detector generating output frequency components at twice the carrier frequency with modulation side band components and components at the modulation frequencies, a band-pass filter connected to the output of the detector for passing signals extending in a band on either side of the carrier frequency but below twice the carrier frequency at the upper end of the filter band-pass and below the upper range of the wideband modulation signal at the lower end of the filter band-pass, a nonlinear network connected to the output of the bandpass filter for generating additional frequency components including components within the range of the wideband modulation signal, means having two signal inputs for adding the output of the nonlinear network to the output of the detector, and means for adjusting the phase of the two inputs to the adding means to effect phase opposition between one frequency component at the output of the nonlinear network and one of the side band components falling within the modulation signal band.

3. Apparatus as defined in claim 2 wherein the nonlinear network includes a square-law circuit.

4. Apparatus as defined in claim 2 further including means for controlling the amplitude of the output from the nonlinear network as a function of frequency to effect amplitude cancellation between said two signals in phase opposition.

References Cited by the Examiner

UNITED STATES PATENTS

| | | | |
|---|---|---|---|
| 2,716,189 | 8/1955 | Ayres | 328—110 |
| 3,163,717 | 12/1964 | Loughlin | 329—134 X |

OTHER REFERENCES

IBM Technical Disclosure Bulletin, 7–1963, Hopner et al., vol. 6, No. 2, pp. 61–62.

ROY LAKE, *Primary Examiner.*

A. L. BRODY, *Assistant Examiner.*